(12) United States Patent
Kallayil (10) Patent No.: US 8,903,910 B2
(45) Date of Patent: Dec. 2, 2014

(54) CREATING A CUSTOMIZED NEWS COLLECTION BASED ON SOCIAL NETWORKING INFORMATION

(75) Inventor: Gopinath Neelambaran Kallayil, Redwood Shores, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 13/298,221

(22) Filed: Nov. 16, 2011

(65) Prior Publication Data

US 2014/0195605 A1 Jul. 10, 2014

(51) Int. Cl.
*G06F 15/16* (2006.01)
(52) U.S. Cl.
USPC ............................ 709/204; 709/205; 709/206
(58) Field of Classification Search
USPC .......................................................... 709/204
See application file for complete search history.

(56) References Cited

U.S. PATENT DOCUMENTS

| 7,707,122 | B2 | 4/2010 | Hull et al. |
| 2008/0250067 | A1 | 10/2008 | Svendsen |
| 2010/0169789 | A1* | 7/2010 | Cheng et al. .................. 715/738 |
| 2010/0241964 | A1* | 9/2010 | Belinsky et al. .............. 715/738 |
| 2012/0290637 | A1* | 11/2012 | Perantatos et al. ............ 709/203 |

* cited by examiner

*Primary Examiner* — Shaq Taha
(74) *Attorney, Agent, or Firm* — McDermott Will & Emery LLP (57) ABSTRACT

A system and machine-implemented method for generating a customized news collection based on social groups, the method comprising receiving an indication of one or more social groups associated with a user, wherein each of the one or more social groups is associated with the user's account in a social networking service, determining, one or more contacts associated with each of the identified one or more social groups at a social networking service, selecting a set of news items including one or more news items associated with the one or more identified contacts and generating a news collection including a number of the one or more news items of the set of news items for provision to a user.

20 Claims, 4 Drawing Sheets

CREATING A CUSTOMIZED NEWS COLLECTION BASED ON SOCIAL NETWORKING INFORMATION

BACKGROUND

The subject disclosure generally to presenting online news items to a user, and, in particular, to managing the collection of news presented to a user based on social networking information.

Reading news online is becoming more popular. News items are available from a large array of News Providers and on a variety of topics. While the availability of a large collection of news items is useful for providing internet readers with a variety of news from different sources and on different topics, the selection of the right items to read may become burdensome as readers have to go through large numbers of items to find what they are looking for.

Furthermore, usually the news is presented from the point of view of editors (i.e., the news they deem important). Various systems have been implemented to filter news for readers based on user profile information and other criteria indicated by the reader or collected by monitoring reader behavior on the internet. Still, the news items presented to the reader may not reflect the most desirable choices for the reader and may be too large in number for efficient consumption by the reader.

Thus, a more efficient and customized method for presenting online news items to a user may be desirable.

SUMMARY

The disclosed subject matter relates to a method executed on one or more computing devices for generating a customized news collection based on social groups, the method comprising receiving an indication of one or more social groups associated with a user, wherein each of the one or more social groups is associated with the user's account in a social networking service. The method further comprising determining, using the one or more computing devices, one or more contacts associated with each of the identified one or more social groups at a social networking service. The method further comprising selecting a set of news items including one or more news items associated with the one or more identified contacts and generating a news collection including a number of the one or more news items of the set of news items for provision to a user.

The disclosed subject matter further relates to a system for generating a customized news collection based on social groups, the system comprising one or more processors and a machine-readable medium comprising instructions stored therein, which when executed by the processors, cause the processors to perform operations comprising receiving an indication of one or more selection criteria, the one or more selection criteria including one or more social groups associated with the user, wherein each of the one or more social groups is associated with a user account of the user maintained at the social networking service. The operations further comprising selecting a set of news items according to the selection criteria, wherein the selection comprises determining one or more contacts associated with each of the identified one or more social groups at a social networking service and selecting one or more news items associated with the one or more identified contacts. The operations further comprising generating a news collection including a number of news items of the set of news items for provision to a user.

The disclosed subject matter also relates to a machine-readable medium comprising instructions stored therein, which when executed by a machine, cause the machine to perform operations comprising receiving a request from a user to view a news collection. The operations further comprising determining one or more social groups based on the request, wherein each of the one or more social groups is associated with a user account of the user in a social networking service. The operations further comprising determining one or more contacts associated with each of the identified one or more social groups at a social networking service. The operations further comprising selecting a set of news items including one or more news items associated with the one or more identified contacts, wherein the one or more news items associated with a the one or more identified contacts comprise at least a news item that at least one of the one or more identified contacts has taken an action towards or a news article that is determined to be important based on characteristics of a news item that at least one of the one or more identified contacts has taken an action towards and generating a news collection including a number of news items of the set of news items for provision to a user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a method for generating a customized collection of news items available online based on social groups associated with a user (e.g., reader). The user may indicate one or more existing social groups as selection criteria for selecting news items. For example, the user may create a specific group of contacts he/she finds trustworthy for a source of news. Alternatively, the user may select different social groups for receiving different types of news items. The system, upon receiving the selection of the user, identifies the one or more contacts within the specified social group(s). For each of the identified contacts, the system may then identify one or more news items that the identified contacts have taken an action towards (e.g., news items opened/read by the contacts, endorsed by the contacts, forwarded or shared by the contacts, recommended by the contacts). The system may further identify one or more other news items which the system determines newsworthy in view of information relating to the identified contacts. The identified news items my be presented to the user as a customized collection of news items selected for the user in view of the user's selection of one or more social groups.

Furthermore, the system may sort and/or filter the collection of news items according to various criteria including information relating to the social groups, contacts, news items and/or the user. For example, the subject disclosure further provides a method of organizing news items, including filtering or sorting news items (e.g., once the customized collection of news items is selected based on the selected social groups) according to various user-specified and/or machine learned criteria. The criteria may include a matching score of the news items (i.e. the degree to which the news item meets one or more selection criteria) and/or priority assigned to various social groups or individual contacts either explicitly by the user or based on historical behavior of the user with respect to the social groups or individual contacts. Such historical information may be retrieved from the social networking service (e.g., where the social networking service maintains such information or information from which such information may be drawn). For example, a user may be able to explicitly assign a priority to a specific social group or to specific contacts of a social group.

Priorities may be assigned to social groups or individual contacts based on the behavior of the user with respect to news items from the contacts (e.g., a news item provided to the user and associated with the contact) within these groups (either dynamically and/or based on historical behavior). For example, the system may receive an indication of a user's interaction with a news item (e.g., article) displayed to the user within a news collection (e.g., displayed to the user within a customized news page), and may generate criteria for sorting the news items within a collection of news items presented to the user (e.g., before presenting the list to the user, or dynamically while the user is viewing the list).

Such indication may for example include the order in which the user selects to read news items within a customized collection presented to the user. Such information may be collected on a one time basis for the specific news collection being displayed to the user, and/or historically maintained for future use. Furthermore, users may manually push a news item up or down a list (or to a different location within a customized news page or set of pages), thus increasing or decreasing the priority of that news item. The indication of the change in priority may be used to generate or update sorting criteria for sorting news items within the news collection.

Similarly, the user may endorse, recommend or share the news item, and such action may be used to update the sorting criteria according to the characteristics of the news item. The sorting criteria may provide priority information for groups (e.g., social groups, mailing lists), individual users (e.g., contacts within social groups, or other contacts), news topics, news source (e.g., specific sites, or publications), or other similar news item characteristics. Such sorting criteria may for example be used to sort the news items within a customized news collection generated in response to one or more selection criteria (e.g., including one or more social groups). However, the sorting method is not limited to such news collections, and may be used with respect to organizing, filtering or sorting any collection of news items being presented to the user.

According to the identification of the news items based on the selection criteria, and/or sorting/filtering the news items based on the additional sorting criteria, the system may generate a customized news collection of news items for the user (e.g., a list of news items or a news collection similar to a newspaper having a front page according to the sorting of news item in order of importance). Thus, a user is able to leverage the time spent by his/her contacts sorting through news items and their knowledge about the news to read news that is relevant and of interest to the user.

Additionally, since the generated collection of news items (i.e., the personalize newspaper) is based on the collective knowledge of one or more contacts who may have expertise with respect to the news or various categories of news, it may be beneficial for other users to also view the news collection. Especially since these other users may not be associated with contacts having such expertise. The system provides the user with an ability to share the collection of news items (i.e., customized newspaper) with other users without having to expose the contacts whose activities the collection is based on, thus allowing other users to leverage the knowledge and expertise of the user's contacts without the contact's privacy being breached. For example, upon being presented with a news collection, the user may select one or more users (e.g., contacts or social groups) and may share the news collection with these users. While the news collection reflects the knowledge, expertise and time spent by contacts of the user, the shares may not have access to any specific information as to the contacts of the user (e.g., contact information or specific contact associated with the news items of the news collection).

The phrase "news item" as used herein encompasses its plain and ordinary meaning including but not limited to, any content (e.g., video, audio or text) provided for purposes of providing update, information, knowledge, or opinions regarding a topic. Throughout the description of the present subject matter the terms news item and online news item are used interchangeably and refer to news items presented to the user through the internet or other software-based client application. Online news items may include articles, posts, tweets, blog entries or other similar items which may provide update, information, knowledge or opinions regarding various topics. Online news items may include online versions of articles or other similar news items available in a traditional format (e.g., within a newspaper, magazine, pamphlet, TV news report or other similar document) or may include news items generated solely for the purpose of online consumption.

The phrase "customized news collection" as used here encompasses its plain and ordinary meaning, including, but not limited to, a collection of news items presented to a user according to selection criteria specified by the user. In one example, the customized news collection may be presented as a list, or a personalize news page (e.g., similar to pages of a newspaper). In one example, the collection may include different sections similar to a news paper, wherein the section delineators may include topics, periodicals, date and time, relevancy, priority, popularity or other similar news characteristics. The phrase "sorting criteria" as used herein encompasses its plain and ordinary meaning and may include but is not limited to a set of criteria used for organizing news items, and further may include criteria for determining a layout of news items on a user interface displaying a collection of news items to a user. Additionally, the sorting criteria may be further used for other filtering purposes (e.g., selecting or discarding a specific set of news items). Organizing news items according the sorting criteria may include but is not limited to filtering of news items including selecting a set of news items (e.g., from a selected set of news items or the entire collection of news items available for selection) or discarding a specific set of news items, sorting the news items and/or otherwise organizing news items.

The phrase "social networking service" as used herein encompasses its plain and ordinary meaning, including, but not limited to, an online service, platform or site that focuses on building and reflecting of social associations and interactions among users. These associations may be stored within a social graph at each social networking service (e.g., maintained at remote server(s) 120). Users of social networking services may create associations with one another. Such user associations may be defined on a user-to-user basis, or as a group of users associated through membership within a group. As used herein, "contacts" refer to other users that a user is associated with, at one or more social networking services.

A user may create "social groups" (e.g., social circles) including one or more contacts to organize his/her associations. The social groups may be additionally used to control distribution of messages and content to contacts of the user. For example, social groups may include categories to which a user can assign their social networking contacts and better control the distribution and visibility of social networking messages as well as other multimedia content (e.g., documents, and other collaboration objects). In accordance with the subject disclosure, a social group is provided as a data set defining a collection of contacts that are associated with one another. As used herein, a social group can be described from the perspective of an individual that is the center of a particular collection of socially interconnected people, or from the aggregate perspective of a collection of socially interconnected people. In some examples, a social group can have narrowly defined boundaries, all of the members of the social group may be familiar with one another, and permission may be required for a member to join a social group. In accordance with the subject disclosure, a user of an electronic device may define a social group, and the social group, as a data set defining a collection of contacts, may reflect a real-life social group of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

Figure 1:
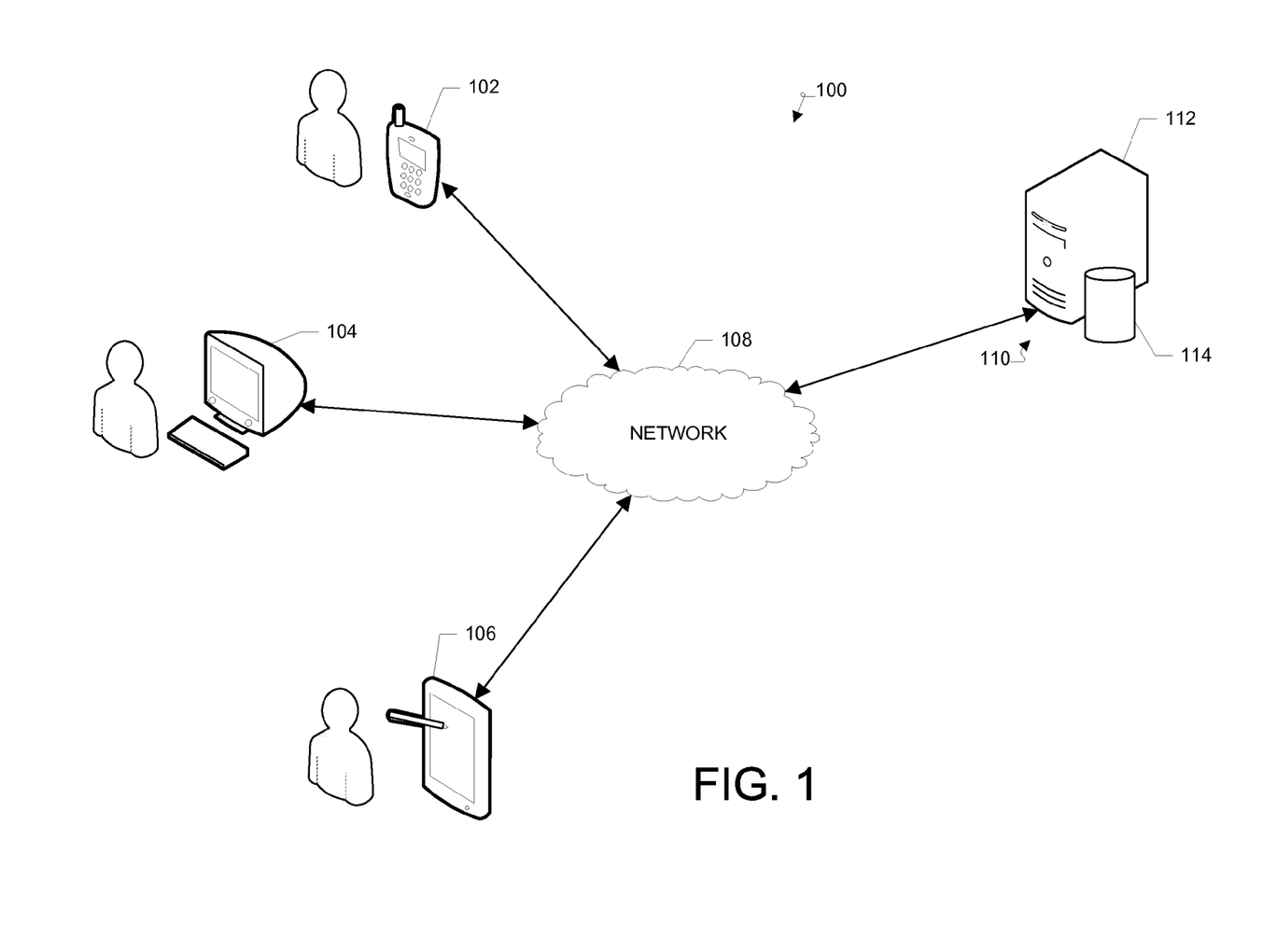
FIG. 1 illustrates an example client-server network environment which provides for providing a customized news collection to a user.

II. Example Client-Server Network Environment for Generating a Customized News Collection FIG. 1 illustrates an example client-server network environment which provides for providing a customized news collection to a user. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in reducing load time for displaying a webpage or web application at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108. In one example, the server 110 may host the present system and/or a browser-based or other software-based news application. The present system (e.g., hosted at server 110) may be installed (e.g., by the user), either as separate system (e.g., a system communicationally coupled to a news service) or as an integrated application within a news application (e.g., news client). In one example, the present system may be communicationally coupled to one or more news services (hosted at a remote server) through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

III. Processes for Generating a Customized News Collection

Figure 2:
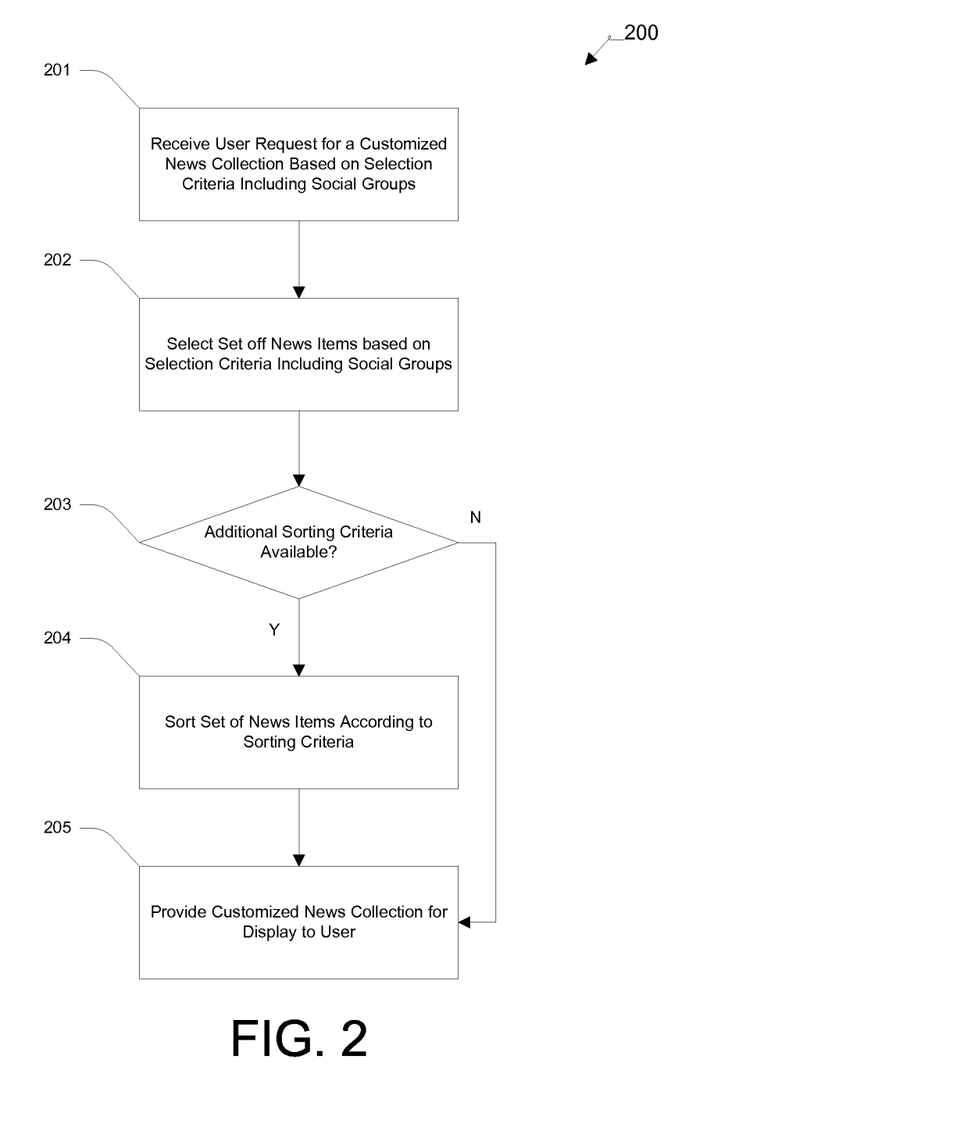
FIG. 2 illustrates a flow diagram of an example process for generating a customized news collection according to social networking information.

FIG. 2 illustrates a flow diagram of an example process 200 for generating a customized news collection according to social networking information. Process 200 begins in block 201 where the system receives a user request for a customized news collection based on one or more selection criteria including one or more social groups. For example, the user may identify one or more social groups associated with the user's user account at one or more social networking services. In one example, the user may further specify one or more other selection criteria for the customized news collection. In another example, the system may have user profile information including one or more social groups and/or other selection criteria associated with a user and may generate a customized news collection to provide to the user upon receiving a user selection to view the news (e.g., logging into the news service).

In block 202, the system identifies and selects a set of news items based on the one or more selection criteria identified by the user including the social groups. In one example, the system may query the social networking service maintaining each of the social groups and request a listing of all contacts within the social group. The identified contacts may include all contacts associated with a social group or those that have granted proper permissions to be identifiable in response to a query (e.g., a query by the system). One or more contacts of the user may opt out of being identified in response to a request to the social networking service. Additionally, the social networking service may allow users to opt into being identifiable by one or more applications (e.g., the system herein for email list filtering).

Upon receiving the listing of contacts from the social networking service, the system may identify one or more news items associated with the contacts of the one or more social groups identified by the user. In one example, the system may identify news items that the one or more contacts have taken an action towards (e.g., opened, read, endorsed, recommended, forwarded, bookmarked). In one example, the system may further identify one or more additional news items that are determined to be newsworthy based on the identified news items. For example, upon identifying the news items, the system may determine one or more topics, or other news item characteristics that are common among the identified news items and may select additional news items associated with the contacts based on their common characteristics with news items that the contacts within the identified social groups have taken an action towards. An example process 300 for generating a set of news items based on social groups is described in further detail below with respect to FIG. 3.

In one example, the social groups may be the only criteria for generating the customized news collection, or may be one of several selection criteria specified by the user. The system further identifies one or more news items based on the other selection criteria specified by the user. In the instance that the social groups are one of a number of selection criteria selected by the user for creating a customized collection, the system may assign a weight or preference to the selected news items. The one or more other selection criteria may for example include topic, category, news source (e.g., specific sites, or publications), date and time, specific authors of news items, or other similar news item characteristics. In one example, upon identifying news items meeting the selection criteria, the system may select one or more of the identified news items for inclusion within the set of news items.

In one example, each of the selection criteria may be assigned a weight and the system may select one or more news items based on the selection criteria including the news items associated with the contacts of the social group and/or the news items meeting one or more of the other selection criteria. For example, in one example, the system may generate a matching score for each of the one or more news items according to the selection criteria (and any weights assigned to the selection criteria) and may select a news item if the news item meets a predefined matching threshold. The news items of the set generated in block 202 may be sorted based on the degree to which each of the selected news items meet the selection criteria, including the social groups and the other selection criteria.

Next, in block 203, the system may determine if there are sorting criteria available for sorting the set of news items identified in block 202. In one example, the system may have access to one or more sorting criteria for sorting news items. For example, the sorting criteria may be provided by the user or may include machine-learned criteria. The sorting criteria may include the matching score for each news item within the identified set of news items. Furthermore, the sorting criteria may include priorities assigned to one or more social groups, contacts, and/or specific news items characteristics such as news item topic (e.g., specified within the subject or content of the news item), news item category (e.g., sports, politics), news item source (e.g., the site or periodical the news item is associated with), news item context (time or date the news item was sent and/or received), and other similar news characteristics. These priorities may be explicitly assigned by the user, or may be assigned by the system based on historical information regarding the user's interaction with news items associated with each of the one or more social groups and/or contacts. The determination in block 203 may depend on whether such information is available and/or whether the user has made a request for sorting the set of news items based on such sorting criteria.

If, in block 203, it is determined that no sorting criteria is available (e.g., no sorting criteria is available or that the user has not requested additional sorting), the process continues to block 205. Otherwise, the process continues to block 204 and sorts the news items (i.e. the filtered news items) according to the sorting criteria. After sorting the news items, the process continues to block 205. In block 205, the system provides a customized news collection including one or more news items of the set of news items for display to the user. In one example, the set of news items may be displayed according to the sorting in block 204. For example the customized collection may be displayed as a sorted list of news items or may be displayed as a customized news page or set of news pages with a layout similar to a newspaper (e.g., front page, sections, etc.).

It should be understood by one of ordinary skill in the art that while the example process 200 is described with respect to sorting news items according to the sorting criteria, similar criteria may be used to filter or otherwise organize news items. While the criteria are referred to herein as sorting criteria, the disclosed criteria may be used for any news item or collection management or organization purposes including sorting or filtering news items.

In one example, the system may further provide for dynamically updating the customized news collection. For example, the system may receive an indication of user action with respect to the one or more news items within the customized news collection (e.g., deleting news items, selecting news items out of order, moving news items down the list, etc.) and may dynamically generate updated (or additional) selection or sorting criteria for further organizing the customized news collection displayed to the user. In one example, user interaction with regard to news items may be received by the system and analyzed to generate or update selection and/or sorting criteria. Thus, in one example, after providing the news item for display the system may receive an indication of user activity with respect to one or more news items within the news collection and may provide the received indication to generate new selection or sorting criteria or update existing selection or sorting criteria (e.g., weights assigned to specific criteria). In one example, the system may further use the received indication of user activity to dynamically update the news collection being displayed to the user or may store the received indication as historical information.

Once the customized news collection is provided for display to the user, the system may further allow the user to share the customized news collection with one or more other users. For example, the customized news collection may be shared with other users similar to sharing a paper newspaper, magazine or other periodical. The user may select one or more users using for example email addresses or may select one or more contacts or social groups associated with the user's account at one or more social networking services and may share the customized news collection with those users. Since the generated collection of news items (i.e., the personalize newspaper) is based on the collective knowledge of one or more contacts who may have expertise with respect to the news or various categories of news, it may be beneficial for other users to also view the newspaper. Especially since these other users may not be associated with contacts having such expertise.

The system provides the user with an ability to share the collection of news items (i.e., customized newspaper) with other users without having to expose the contacts whose activities the collection is based on, thus allowing other users to leverage the knowledge and expertise of the user's contacts without the contact's privacy being breached. For example, upon being presented with a news collection, the user may select one or more users (e.g., contacts or social groups) and may share the news collection with these users. While the news collection reflects the knowledge, expertise and time spent by contacts of the user, the sharees may not have access to any specific information as to the contacts of the user (e.g., contact information or specific articles read by the users).

Figure 3:
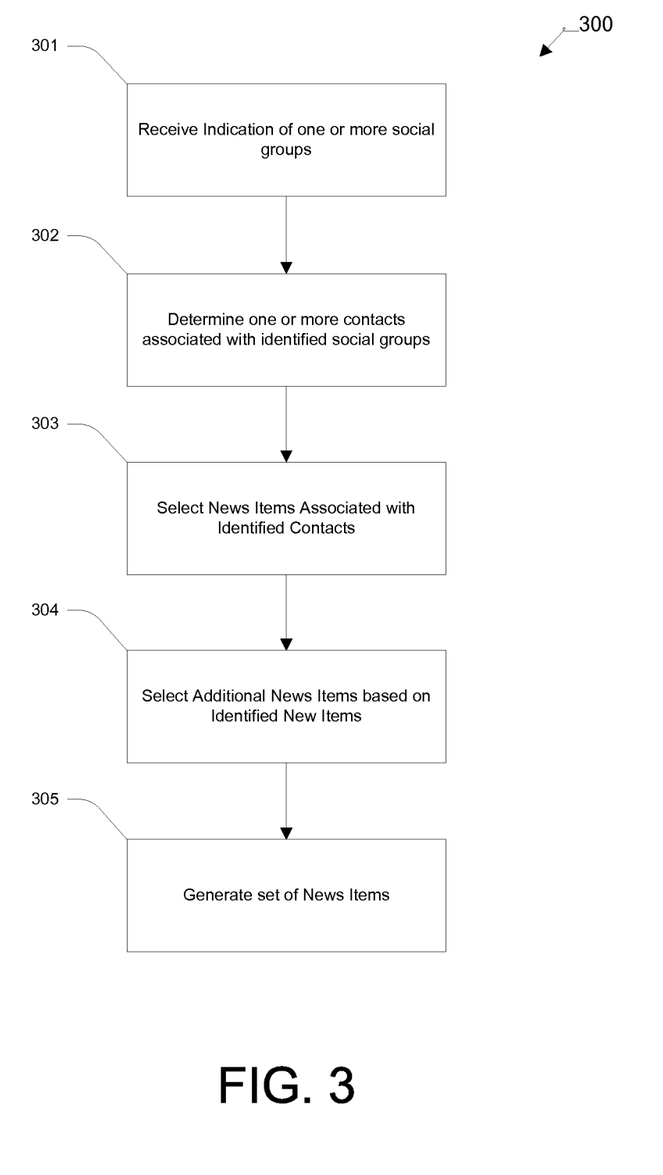
FIG. 3 illustrates a flow diagram of an example process for generating a set of news items based on social groups.

FIG. 3 illustrates a flow diagram of an example process 300 for generating a set of news items based on social groups. In block 301, the system receives an indication of one or more social groups associated with a user. For example, a user may select one or more social groups for generating a customized news collection. In another example, the system may have priority information for one or more social groups associated with a user and may identify the social groups to automatically generate a customized news collection to provide to the user (e.g., based on a user or system setting). In block 302, the system determines one or more contacts associated with each of the one or more social groups. In one example, the social groups may be maintained within the social graph of a social networking service and may be associated with the user's account at the social networking service. The system may query the social networking service (e.g., through an API call to the social networking service) to receive contacts associated with the social group.

In block 303, the system selects one or more news items associated with the identified contacts. In one example, the system may identify news items which each contact of the one or more social groups has taken an action towards. These actions may for example include contacts opening or reading a news item, endorsing a news item, recommending a news item, bookmarking a news item, and/or sharing the news item. Additionally, in block 304, the system may further select one or more additional news items that are considered to be newsworthy based on the news items that one or more of the identified contacts have taken an action towards.

For example, upon identifying the first set of news items, the system may detect a trend in the topics being viewed by contacts of a social group and may retrieve additional news items relating to those news items that the contacts have taken an action towards. Furthermore, the system may detect news items that the contacts have taken an action towards and may retrieve more recent or updated news items relating the identified news items associated with the one or more contacts.

In one example, the news items identified in block 303 may be limited to news items having a specific date range. In one example, where a news item that a contact has taken an action towards is outdated, the system may identified more recent news items that are related to same or similar topics or has other characteristics in common with the news item that a contact has taken an action towards. Finally, in block 305, the system generates a set of news items including the news items identified in block 303 and/or 304. In one example, the system may determine whether the user has requested a broad or narrow set of news items, and may identify additional news items only if the user has requested a broad range of news items. Alternatively, the system may identify the additional news items and provide the news items for further filtering based on other selection criteria. Still further, the system may only provide the narrow set of news items to the user but may allow for toggling between a narrow and broad view while the user is viewing the news collection.

While the subject disclosure refers to news items viewed within a news service, it should be understood by one of ordinary skill in the art, that the above processes may be implemented with respect to any news items or other similar multi-media content (e.g., video, audio) and may be implemented with respect to various browser and software-based client applications.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example System for Generating a Customized News Collection

Figure 4:
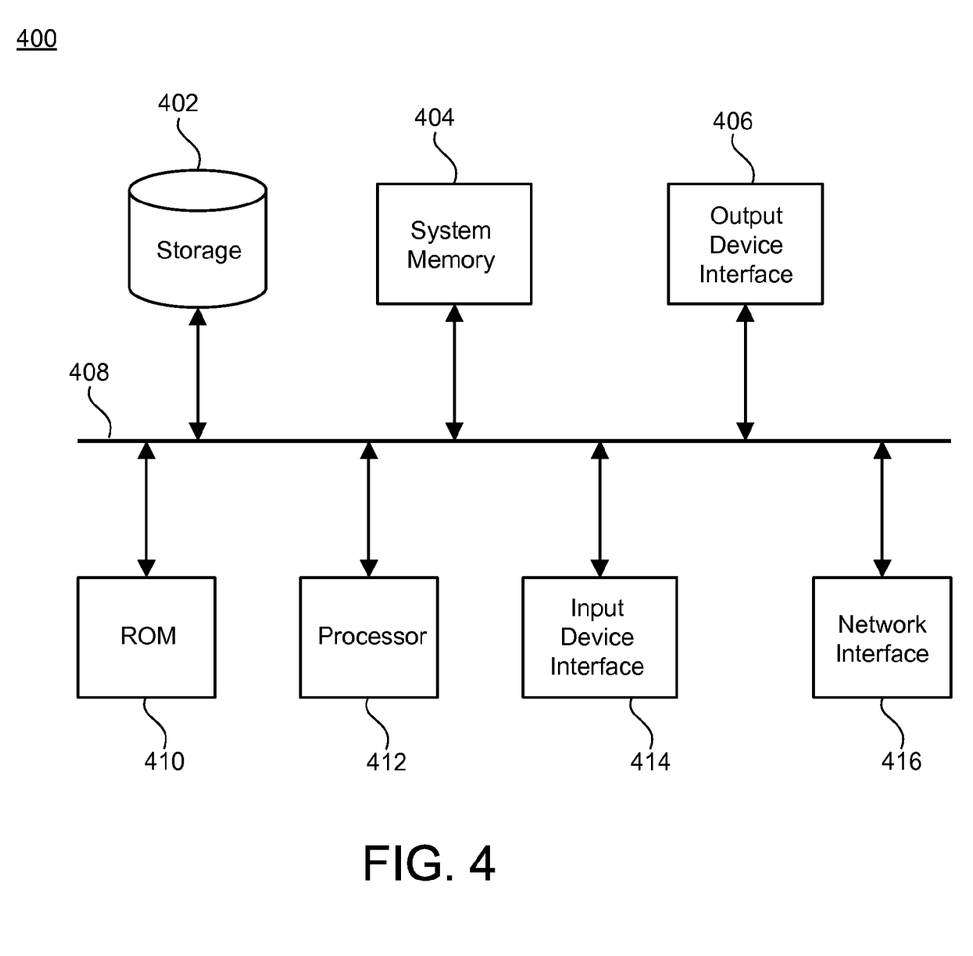
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for filtering news items according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method executed on one or more computing devices for generating a customized news collection based on social groups, the method comprising:

receiving a request from a user for a customized news collection based on one or more social groups;

receiving a selection of the one or more social groups from a plurality of social groups by the user as part of the request, wherein each of the plurality of social groups is associated with the user's account in a social networking service;

determining, using the one or more computing devices, one or more contacts associated with the one or more social groups selected by the user in response to receiving the selection of the one or more social groups;

identifying a plurality of news items available to the user, wherein at least one of the plurality of news items comprises a news item generated at a news service or provided for consumption at a news service, wherein the news service is distinct from the social networking service;

selecting a set of news items from the plurality of news items in response to receiving the selection of the one or more social groups, wherein the set of news items includes at least one news items selected based on the interaction of one or more contacts associated with at least one of the one or more social groups with the at least one news item; and sorting the set of news items according to one or more sorting criteria, wherein the sorting criteria include one or more priorities assigned to one or more news characteristics associated with a news item, the sorting comprising:

determining a priority assigned to one or more news characteristics associated with each of the news items of the set of news items; and ranking the news items of the set of news items according to the priorities;

generating a news collection including one or more news items of the set of news items in response to the request from the user in response to the sorting.

2. The method of claim 1, wherein the request includes an indication of the one or more social groups.

3. The method of claim 1, further comprising:

determining additional selection criteria, wherein the set of news items is further identified based one the additional selection criteria.

4. The method of claim 3, wherein the selection criteria includes one or more news item characteristics including at least one of a topic, category, news source, author, time or date.

5. The method of claim 3, wherein the additional criteria is specified by the user.

6. The method of claim 3, wherein the additional criteria is determined based on user profile information.

7. The method of claim 1, wherein the one or more social groups are identified based on user profile information of the user.

8. The method of claim 1, wherein the one or more priorities are assigned by the user.

9. The method of claim 1, wherein the priorities are assigned based on the user's interaction with news items.

10. The method of claim 1, further comprising:
providing the news collection for display to the user; and
receiving an indication of user activity with response to at least one news item of the news collection.

11. The method of claim 10, further comprising:
updating at least one of the selection criteria or the sorting criteria in response to receiving the indication; and
generating an updated news collection according to the updated criteria.

12. The method of claim 1, wherein the determining the one or more contacts comprises:
sending a request for contacts associated with each of the one or more social groups to the social networking service associated with the social group; and
receiving the one or more contacts associated with each of the one or more social groups.

13. The method of claim 1, wherein the one or more news items associated with a the one or more identified contacts comprise at least a news item that at least one of the one or more identified contacts has taken an action towards or a news article that is determined to be important based on characteristics of a news item that at least one of the one or more identified contacts has taken an action towards.

14. The method of claim 1, wherein the action comprises one or more of opening the news item, reading the news item, endorsing the news item, recommending the news item, or sharing the news item.

15. A system for generating a customized news collection based on social groups, the system comprising:
one or more processors; and
a non-transitory machine-readable medium comprising instructions stored therein, which when executed by the processors, cause the processors to perform operations comprising:
receiving an indication of a request from a user for a customized news collection;
receiving a selection of the one or more social groups from a plurality of social groups by the user as part of the request, wherein each of the plurality of social groups is associated with user account of the user maintained at a social networking service;
selecting a set of news items according to one or more selection criteria in response to the request, the one or more selection criteria including the one or more social groups selected by the user, wherein the selection comprises:
determining one or more contacts associated with the one or more social groups at a social networking service in response to receiving the selection; and
identifying a set of news items including one or more news items that at least one of the one or more contacts interacted with from a plurality of news items available to the user in response to receiving the selection, wherein at least one of the one or more news items comprises a news item generated at a news service or provided for consumption at a news service, wherein the news service is distinct from the social networking service;
sorting the one or more news items of the identified set of news items according to one or more sorting criteria, wherein the sorting criteria include one or more priorities assigned to one or more news characteristics associated with a news item, and wherein the sorting process comprises:
determining a priority assigned to one or more news characteristics associated with each of the one or more news items of the set of news items;
ranking the one or more news items of the set of news items according to the priorities; and
generating a news collection including a number of news items of the set of news items for provision to a user in response to the sorting.

16. The system of claim 15, wherein the one or more selection criteria further comprise one or more news item characteristics, and
wherein selecting the set of news items further comprises selecting one or more news items having the one or more news item characteristics.

17. The system of claim 15, wherein the one or more news items associated with a the one or more identified contacts comprise at least a news item that at least one of the one or more identified contacts has taken an action towards or a news article that is determined to be important based on characteristics of a news item that at least one of the one or more identified contacts has taken an action towards.

18. A non-transitory machine-readable medium comprising instructions stored therein, which when executed by a machine, cause the machine to perform operations comprising:
receiving a request from a user to view a customized news collection;
determining one or more social groups based on the request, wherein each of the one or more social groups is selected by the user from a plurality of social groups with a user account of the user in a social networking service;
determining one or more contacts associated with each of the selected one or more social groups at a social networking service in response to the selection;
selecting a set of news items from a plurality of news items available for viewing by the user in response to the selection, the set of news items including one or more news items associated with the one or more identified contacts, wherein at least one of the one or more news items comprises a news item generated at a news service or provided for consumption at a news service and wherein the one or more news items associated with a the one or more identified contacts comprise at least a news item that at least one of the one or more identified contacts has taken an action towards or a news article that is determined to be important based on characteristics of a news item that at least one of the one or more identified contacts has taken an action towards;
sorting the one or more news items of the identified set of news items according to one or more sorting criteria, wherein the sorting criteria include one or more priorities assigned to one or more news characteristics associated with a news item, and wherein the sorting process comprises:
determining a priority assigned to one or more news characteristics associated with each of the one or more news items of the set of news items;

ranking the one or more news items of the set of news items according to the priorities; and generating a news collection including a number of news items of the set of news items for provision to a user in response to the request in response to the sorting.

19. The machine-readable medium of claim 18, the operations further comprising:

determining one or more additional selection criteria associated with the user; and selecting the set of news items further based on the one or more additional selection criteria.

20. The machine-readable medium of claim 18, the operations further comprising:

sorting the set of news items according to one or more sorting criteria; and generating the news collection in response to the sorting.

* * * * *